US011898570B2

(12) United States Patent
Pensler et al.

(10) Patent No.: US 11,898,570 B2
(45) Date of Patent: Feb. 13, 2024

(54) PUMP ASSEMBLY COMPRISING A LUBRICATION—AND COOLING SYSTEM

(71) Applicant: KSB SE & Co. KGaA, Frankenthal (DE)

(72) Inventors: Thomas Pensler, Frankenthal (DE); Christoph Jaeger, Frankenthal (DE); Daniel Ziegs, Frankenthal (DE); Hermann Bonitz, Frankenthal (DE)

(73) Assignee: KSB SE & Co. KGaA, Frankenthal (DE)

( * ) Notice: Subject to any disclaimer, the term of this patent is extended or adjusted under 35 U.S.C. 154(b) by 94 days.

(21) Appl. No.: 17/628,952

(22) PCT Filed: Jul. 20, 2020

(86) PCT No.: PCT/EP2020/070425
§ 371 (c)(1),
(2) Date: Jan. 21, 2022

(87) PCT Pub. No.: WO2021/013782
PCT Pub. Date: Jan. 28, 2021

(65) Prior Publication Data
US 2022/0260085 A1    Aug. 18, 2022

(30) Foreign Application Priority Data
Jul. 23, 2019    (DE) .................. 10 2019 005 095.9

(51) Int. Cl.
*F04D 29/06*    (2006.01)
*F04D 1/00*    (2006.01)
(Continued)

(52) U.S. Cl.
CPC ............. *F04D 29/061* (2013.01); *F04D 1/00* (2013.01); *F04D 29/0462* (2013.01);
(Continued)

(58) Field of Classification Search
CPC .. F04D 29/061; F04D 29/0462; F04D 29/586; F04D 13/633; F16N 13/20
See application file for complete search history.

(56) References Cited

U.S. PATENT DOCUMENTS 2,251,469 A    8/1941    Smith
2,844,418 A *  7/1958    Audemar .............. F04D 29/061
                                              415/58.4
(Continued)

FOREIGN PATENT DOCUMENTS

CN    201016366 Y    2/2008
CN    205918634 U *  2/2017
(Continued)

OTHER PUBLICATIONS

International Search Report (PCT/ISA/210) issued in PCT Application No. PCT/EP2020/070425 dated Sep. 25, 2020 with English translation (four (4) pages).

(Continued)

*Primary Examiner* — David E Sosnowski
*Assistant Examiner* — Jackson N Gillenwaters
(74) *Attorney, Agent, or Firm* — Crowell & Moring LLP

(57) ABSTRACT

A pump assembly for delivering a medium via a flow chamber (13) defined by a hydraulic housing and a housing cover, includes a pump shaft rotatably drivable about an axis of rotation, an impeller fixed to one end of the pump shaft inside the flow chamber, a bearing carrier. The pump assembly further includes a lubrication and cooling system with oil recirculation in the bearing carrier.

17 Claims, 3 Drawing Sheets

(51) Int. Cl.
*F04D 29/046* (2006.01)
*F04D 29/58* (2006.01)
*F16C 33/66* (2006.01)
*F16N 13/20* (2006.01)

(52) U.S. Cl.
CPC ........ *F04D 29/586* (2013.01); *F16C 33/6659* (2013.01); *F16N 13/20* (2013.01); *F16N 2013/205* (2013.01); *F16N 2210/14* (2013.01); *F16N 2210/16* (2013.01)

(56) References Cited

U.S. PATENT DOCUMENTS

| | | | | |
|---|---|---|---|---|
| 3,520,642 | A * | 7/1970 | Fulton | H02K 49/00 310/104 |
| 5,051,007 | A | 9/1991 | Maddox et al. | |
| 5,409,350 | A * | 4/1995 | Mitchell | F04D 29/049 415/113 |
| 2012/0219403 | A1 * | 8/2012 | Riley | F04D 29/061 415/170.1 |
| 2014/0093201 | A1 | 4/2014 | Hashish | |
| 2018/0245636 | A1 | 8/2018 | Na et al. | |

FOREIGN PATENT DOCUMENTS

| | | | |
|---|---|---|---|
| CN | 205918634 U | 2/2017 | |
| DE | 1 156 493 B | 10/1963 | |
| DE | 11 2016 003 754 T5 | 5/2018 | |
| EP | 0013869 A1 * | 8/1980 | ............ F04D 13/06 |
| WO | WO 2013/187786 A1 | 12/2013 | |

OTHER PUBLICATIONS

German-language Written Opinion (PCT/ISA/237) issued in PCT Application No. PCT/EP2020/070425 dated Sep. 25, 2020 (five (5) pages).

German-language Office Action issued in German Application No. 10 2019 005 095.9 dated Jun. 4, 2020 (six (6) pages).

International Preliminary Report on Patentability (PCT/IB/338 & PCT/IB/373) issued in PCT Application No. PCT/EP2020/070425 dated Feb. 3, 2022, including English translation of document C2 (German-language Written Opinion (PCT/ISA/237), filed on Jan. 21, 2022) (seven (7) pages).

* cited by examiner

PUMP ASSEMBLY COMPRISING A LUBRICATION—AND COOLING SYSTEM

BACKGROUND AND SUMMARY OF THE INVENTION

The present invention relates to a pump arrangement having a flow chamber which is formed by a hydraulics housing and by a housing cover, and having a bearing carrier.

Pump arrangements of said type are used in numerous applications for conveying fluids. If pump arrangements of said type are required for large power ranges, there is generally a need for circulating oil lubrication in order for the bearings to be sufficiently lubricated and cooled. Normally, an external lubricant pump, a heat exchanger and a large number of hydraulic lines are required for this purpose. In the event of failure of the lubricant pump, there is the risk of the main pump also failing after a short time owing to bearing damage.

It is an object of the present invention to provide a pump arrangement having the simplest and most reliable lubrication and cooling system possible for the bearings of the pump arrangement.

According to the present invention, the pump arrangement for conveying a medium comprises a flow chamber which is formed by a hydraulics housing and by a housing cover, a pump shaft which can be driven in rotation about an axis of rotation, an impeller which is fastened to an end of the pump shaft that is situated within the flow chamber, and a bearing carrier. The invention is distinguished by a lubrication and cooling system with provision for oil circulation in the bearing carrier.

The provision for internal oil circulation in the bearing carrier makes it possible to dispense with an external lubricant pump, a heat exchanger and various hydraulic lines. The number of components is reduced as a result of the internal lubrication and cooling system, and in this way the likelihood of failure is lowered. The lubrication of the bearings is ensured even in the event of power failure during the after-run of the pump shaft.

According to a development of the invention, in its interior, a body element of the bearing carrier has a first bearing receptacle, for receiving a first bearing, and a second bearing receptacle, for receiving a second bearing, for the mounting of a pump shaft rotatable about an axis of rotation.

In a preferred configuration, a conveying element which is formed on the pump shaft or which is arranged on the pump shaft as a separate element is provided within the bearing carrier or body element between the first bearing and the second bearing. In this way, a space-saving design is possible.

Advantageously, at least one chamber which surrounds the pump shaft is provided in the bearing carrier close to the first bearing receptacle. In this case, the chamber has, in plan view, substantially the shape of a circular ring. The chamber may be formed for receiving at least one oil filter.

As an advantageous alternative, it may be provided that the at least one chamber is subdivided into individual segments by separating walls. In this case, the individual segments of the chamber have, in plan view, substantially the shape of an annular sector. At least one oil filter can be installed in each individual segment. The volume of a separating wall may be a number of times larger than the volume of a chamber segment. This makes it possible to significantly reduce the amount of oil needed for the oil circulation.

According to a preferred embodiment of the invention, a filler body which surrounds the pump shaft is provided in the interior of the bearing carrier. This makes it possible to further significantly reduce the amount of oil needed for the oil circulation.

Here, it is advantageous, due to the material-saving property, for the filler body to have an inner wall, which faces toward the pump shaft, and an outer wall, which faces away from the pump shaft, which form a cavity.

For optimum oil circulation, in an advantageous configuration, the filler body is arranged, and is dimensioned in terms of its radial extent, in such a way that a first annular space is formed between the filler body and the pump shaft and a second annular space is formed between the filler body and the outer wall of the bearing carrier.

In this way, optimum flow channels can be created within the bearing carrier or the body element.

In a further advantageous embodiment, a first annular space is provided between the filler body and the pump shaft, wherein the filler body extends in a radial direction as far as the inner lateral surface of the outer wall of the bearing carrier, and provision is made of at least one groove at the outer side of the outer wall of the filler body. This makes it possible to achieve a particularly stable position of the filler body.

In an advantageous configuration, an annular projection extends into a region within the bearing cover, at the free face side of which annular projection at least one cutout is provided. In this way, simple and effective flow channels can be created.

The attachment of a guide device to the free face side of the projection makes possible loss-optimized diversion for the oil circulation.

According to a preferred embodiment of the invention, a fan cover is fastened to the body element, wherein, within the fan cover, a fan wheel is attached to the pump shaft. The fan wheel generates an air stream which is diverted by the fan cover and guided over the outer side of the bearing carrier. In this way, the transfer of heat from the upper bearing carrier to the ambient air is increased.

A particularly simple and effective configuration for the conveying element is obtained if the conveying element comprises an annular element. In this configuration, the annular element has a first face side and a second face side, which is situated opposite the first face side.

Here, it is advantageous if at least one vane is arranged on the outer lateral surface of the annular element and extends from a region close to the first face side in a diagonal direction to a region close to the second face side. In this way, the vane(s) is/are formed in such a way that conveyance of the oil is realized in both directions of rotation. Consequently, in the event of a possible power failure, whereby the direction of rotation of the pump shaft can be reversed, adequate oil circulation and thus lubrication of the bearings and cooling of the lubricant is nevertheless maintained.

Further advantages, features and effects of the present invention can be found in the following drawings, in which:

DETAILED DESCRIPTION

Figure 1:
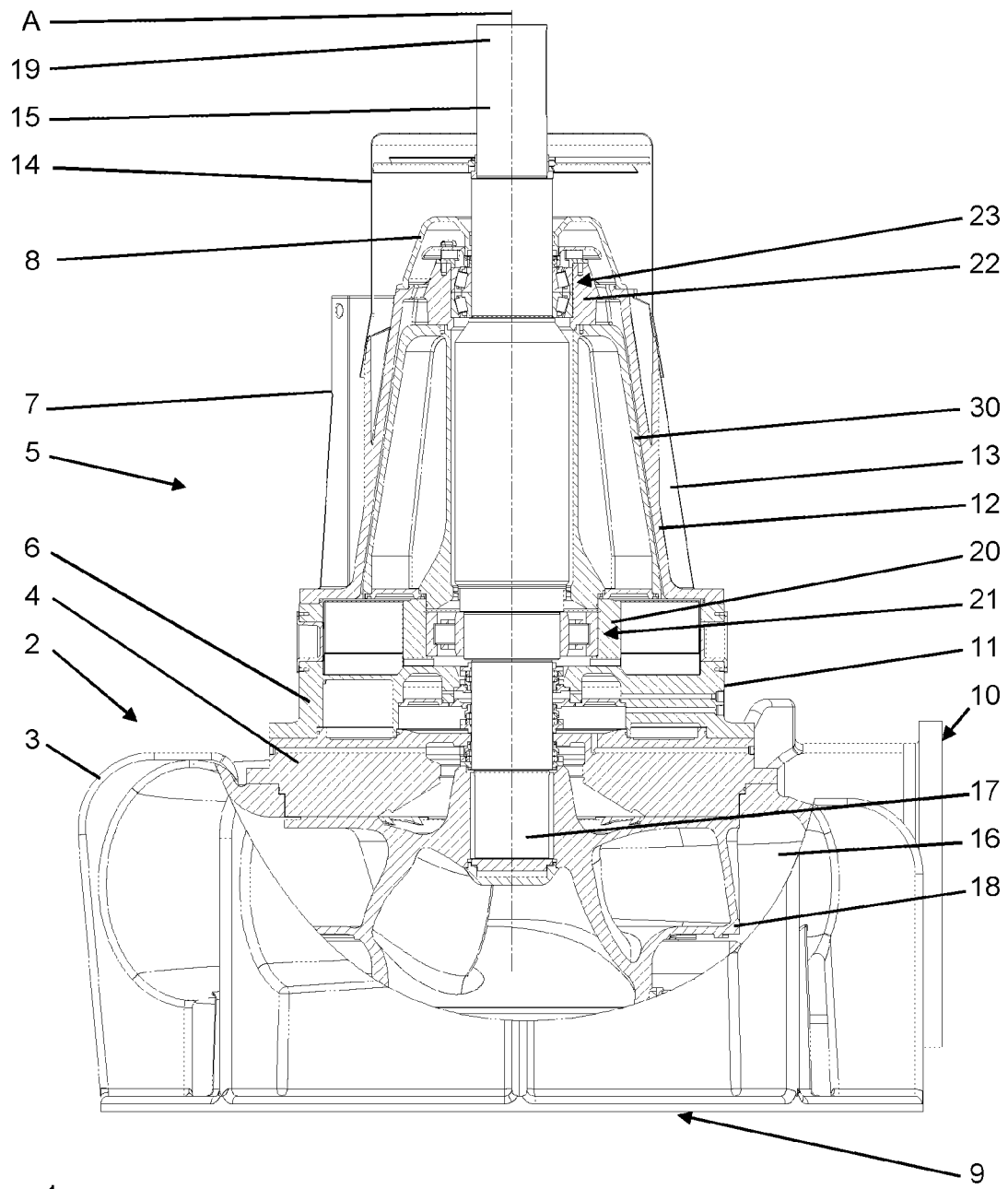
FIG. 1 shows the sectional view of a pump arrangement according to the invention with an internal lubrication and cooling system.
Figure 2:
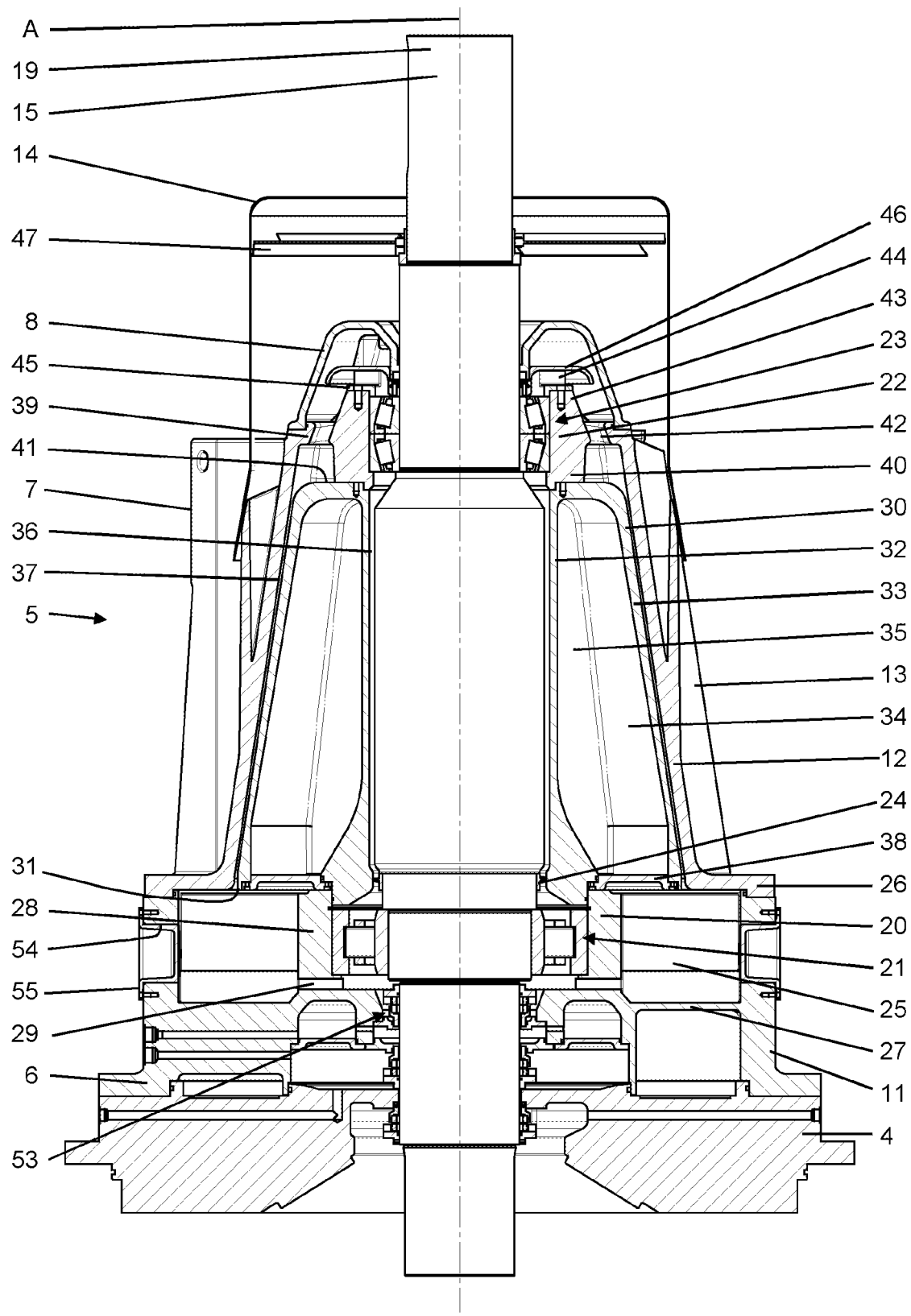
FIG. 2 shows a partial view in a sectional illustration of the pump arrangement as per FIG. 1.

FIG. 1 shows, in conjunction with FIG. 2, a pump arrangement 1 having a spiral housing 2, which spiral housing is formed at least from a hydraulics housing 3 and a housing cover 4 which closes off the hydraulics housing 3 on one side. The pump arrangement 1 furthermore comprises a bearing carrier 5, which is formed at least from a first body element 6, a second body element 7 and a bearing cover 8. The pump arrangement 1 has a lubrication and cooling system with provision for oil circulation in the bearing carrier 5.

The hydraulics housing 3 has, at the reference sign 9, an inlet opening for the intake of a conveying medium and, at the reference sign 10, an outlet opening for the expulsion of the conveying medium. The housing cover 4 is arranged on that side of the hydraulics housing 3 which is situated opposite the inlet opening 9. The first body element 6 of the bearing cover 5 is fastened to the housing cover 4 on that side of the housing cover 4 which faces away from the hydraulics housing 3. The second body element 7 is fastened on that side of the first body element 6 which faces away from the housing cover 4. The bearing cover 8 is in turn fastened on that side of the body element 7 which faces away from the first body element 6.

The first body element 6 of the bearing carrier 5 comprises substantially a circular-cylindrical outer wall 11. The second body element 7 comprises an outer wall 12, which, in the exemplary embodiment shown, has a conical shape and narrows from the first body element 6 in the direction of the bearing cover 8. Cooling ribs 13 which extend substantially in an axial direction are provided on the outer lateral surface of the outer wall 12 of the bearing cover 5 or of the second body element 7.

A fan cover 14 is fastened to the bearing carrier 5 or to the second body element 7 on the side facing away from the first body element 6. The fan cover 14 in this case surrounds the bearing cover 8 and extends at least partially over the cooling ribs 13 of the bearing carrier 5 or of the second body element 7.

The pump arrangement has a pump shaft 15 which can be driven in rotation about an axis of rotation A. Said pump shaft extends from a flow chamber 16, which is delimited by means of the hydraulics housing 3 and the housing cover 4, through an opening in the housing cover 4 and further through the first body element 6, the second body element 7, the bearing cover 8 and the fan cover 14.

An impeller 18 for conveying a medium is fastened to an end 17 of the pump shaft 15 that is situated within the flow chamber 16. An end 19 of the pump shaft 15 that is situated opposite the shaft end 17 is connected to a drive apparatus (not illustrated), for example a drive motor, preferably an electric motor.

In its interior, the bearing carrier 5 has in a region close to the housing cover 4, or the first body element 6 has in a region close to the second body element 7, a first bearing receptacle 20 for receiving a first bearing 21. A second bearing receptacle 22 for receiving a second bearing 23 is provided in a region close to the bearing cover 8. The pump shaft 15, which is rotatable about the axis of rotation A, is mounted by means of the two bearings 21 and 23.

A conveying element 24 which is formed on the pump shaft 15 or which is arranged on or fastened to the pump shaft 15 as a separate element is provided within the bearing carrier 5 between the first bearing 21 and the second bearing 23.

At least one chamber 25 which substantially surrounds the pump shaft 15 is provided in the bearing carrier 5 or in the first body element 6 close to the first bearing receptacle 20. In the example shown, the chamber 25 is delimited substantially by a radial flange 26 of the second body element 7, by way of which said second body element is fastened to the first body element 6, by a first wall 27, which extends in a direction toward the axis of rotation A, by the first bearing receptacle 20, which corresponds substantially to an axial second wall 28 extending parallel to the axis of rotation A, and by a part of the outer wall 11. The radial first wall 27 connects the outer wall 11 to the first bearing receptacle 20 or to the second wall 28. At least one passage bore 29 is provided in the axial wall 28.

A filler body 30 which surrounds the pump shaft 15 is provided in the interior of the bearing carrier 5 or substantially in the interior of the second body element 7. Said filler body extends from the first bearing receptacle 20 to the second bearing receptacle 22. The filler body 30 bears by way of a first face side 31 against the first body element 6. The filler body 30 has a substantially hollow-cylindrical construction and surrounds the pump shaft 15. It comprises an inner wall 32, which faces toward the pump shaft 15, and an outer wall 33, which faces away from the pump shaft 15. In the exemplary embodiment shown, the outer wall 33 has a conical or frustoconical profile. The inner wall 32 and the outer wall 33 form a cavity 34, wherein provision may be made of connecting webs 35 which connect the inner wall 32 to the outer wall 33 and make the filler body 30 more stable. In the exemplary embodiment shown, the filler body 30 is arranged, and is dimensioned in terms of its radial extent, in such a way that a first annular space 36 is formed between the filler body 30 and the pump shaft 15 and a second annular space 37 is formed between the filler body 30 and the outer wall 12 of the bearing carrier 5 or of the second body element 7.

In the exemplary embodiment shown, the first annular space 36 is of circular-cylindrical form. The second annular space 37 has a conical profile corresponding to the filler body 30 and to the outer wall 12 of the second body element 7. The radial extent of the conveying element 24 is selected in such a way that it can be arranged in the first annular space 36.

As shown in FIG. 2, that face side 31 of the filler body 30 which faces toward the first body element 6 is closed off in a fluid-tight manner by means of an annular disk-like cover 38, with the result that no oil is able to enter the cavity 34.

In the region of the second bearing receptacle 22, which is connected to the outer wall 12 by means of a disk-like connecting element 39, there extends into the interior of the second body element 7 in an axial direction a first annular projection 40, against which a second face side 41, situated opposite the first face side 31, of the filler body 30 comes into abutment. The connecting element 39 is connected in one piece to the outer wall 12 and to the second bearing receptacle 22. At least one passage bore 42 extends through the connecting element 39.

In the direction opposite to that of the annular projection 40, a second annular projection 43 extends into a region which is situated within the bearing cover 8. At least one cutout 44 is provided at the free face side of the annular projection 43. The fastening lug 45 of a securing ring, for fastening of the second bearing 23, is placed in the at least one cutout 44. Moreover, a guide device 46 is attached to the free face side of the annular projection 43. The guide device 46 is of annular form and surrounds the pump shaft 15. Moreover, the guide device 46 is, as viewed in section, shaped like a spherical cap.

Within the fan cover 14, a fan wheel 47 is attached to the pump shaft 15.

Figure 3:
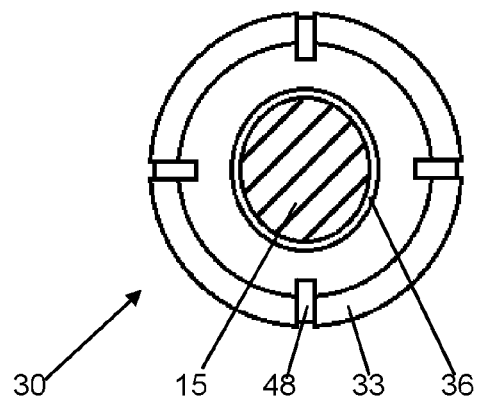
FIG. 3 shows the plan view of a filler body inserted in the pump arrangement as per FIG. 1.

In an alternative embodiment of the filler body 30, as is shown in FIG. 3, the first annular space 36 is provided between the filler body 30 and the pump shaft 15, but the filler body extends in a radial direction as far as the inner lateral surface of the outer wall 12 of the bearing carrier 5, wherein provision is made of at least one of the grooves 48 illustrated in FIG. 3 at the outer side of the outer wall 33 of the filler body 30. For a better overview, the sectioned pump shaft 15 and the first annular space 36 are also illustrated in FIG. 3.

In an alternative embodiment of the first body element 7, the chamber 25 may be subdivided into individual segments by further separating walls (not illustrated) that extend from the outer wall 11 to the first bearing receptacle 20 and from the first wall 27 to the cover 38. In this case, each segment has a passage bore 29 in the axial wall 28.

If the embodiment shown in FIG. 3 of the filler body 30 is combined with a second body element 7 which is segmented into multiple chambers 25, at least one groove 48 opens out into one of the chambers 25. Where required, provision is to be made for this purpose of corresponding means for mechanical coding for unambiguous orientation or positioning of the filler body 30 at the first body element 6.

Figure 4:
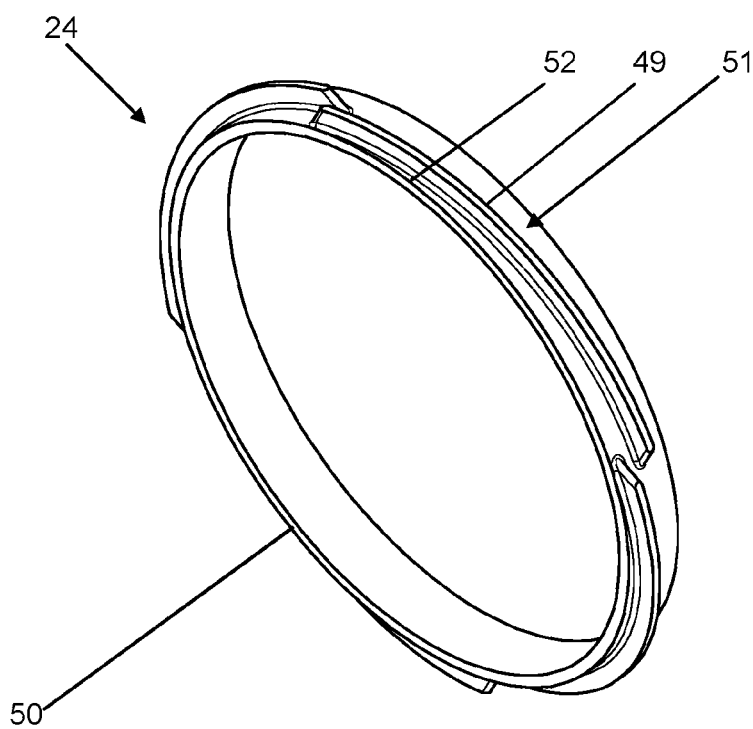
FIG. 4 shows a detailed illustration of a conveying element inserted in the pump arrangement as per FIG. 1.

FIG. 4 shows the conveying element 24 in a detailed illustration. The conveying element 24 comprises an annular element 49 with a first face side 50 and with a second face side 51, which is situated opposite the first face side 50. At least one vane 52 is arranged on the outer lateral surface of the annular element 49. In the exemplary embodiment shown, four identical vanes 52 are arranged so as to be distributed uniformly over the outer lateral surface. The vanes 52 extend from a region close to the first face side 50 in a diagonal direction over an annular sector to a region close to the second face side 51.

In the example illustrated in FIG. 4, the conveying element 24 is of screw-like form, wherein the vanes 52 arranged on the annular element 49 each form approximately one quarter of a thread turn. In an alternative embodiment, the annular element may extend in an axial direction in such a way that there is at least one full thread turn on the annular element 49.

During operation, that region of the pump arrangement 1 which is separated from the flow chamber 16 by the first body element 6 and by a seal arrangement 53 which is arranged in the first body element 6 (said region being shown in FIGS. 1 and 2) is filled with oil. In the embodiment shown in FIG. 1 or in FIG. 2 of the pump arrangement 1, the filling of the pump arrangement 1, in particular of the bearing carrier 5, with oil is realized via an opening (not illustrated) in the bearing cover 8, said opening being closable in a fluid-tight manner by way of suitable means. The oil level is in this case advantageously above the guide device 46. The conveying element 24 causes circulation of the oil in the bearing carrier 5. The conveying element 24 is arranged in the bearing carrier 5 between the first bearing 21 and the second bearing 23. Said conveying element conveys the oil in the first annular space 36 along the pump shaft 15 (upward in the exemplary embodiment shown) in the direction of the second bearing 23 and pushes the oil through the bearing 23.

After the oil has passed through the bearing 23, it is diverted by the guide device 46, moves away from the pump shaft 15, and flows into the second annular space 37 through the at least one cutout 44 and the passage bore 42 and into the chamber 25 or into one of the segments of the chamber 25. If a filler body 30 as per FIG. 3 is used, the oil flows into the chamber 25, or into one of the segments of the chamber 25, through the at least one groove 48. It is optionally possible for provision to be made of oil filters (not illustrated) in the chamber 25 or in the segments of the chamber 25. The oil filters may be installed via the openings 54 provided in the outer wall 11 of the first body element 6. The openings 54 are closed off in a fluid-tight manner by way of a cover 55.

The oil is subsequently sucked through the passage bore or passage bores 29 in the direction of the pump shaft 15 and through the first bearing 21 by the conveying element 24. A pressureless oil circuit is involved. Consequently, in the case of the vertical installation position of the bearing carrier 5 shown, sealing of the bearing cover 8 with respect to the pump shaft 15 is not required.

During operation, heat is generated by way of bearing friction and flow losses. When the bearings 21 and 23 are flowed through, the majority of the heat is absorbed by the oil. The majority of the heat absorbed by the oil is released to the surroundings via the bearing carrier 5 when flowing through the outer annular space 37. In order to increase the rate of heat flow to the surroundings and to thereby lower the temperature level in the bearing carrier 5, the bearing carrier 5, or the second body element 7, on the outer lateral surface of its outer wall 12, preferably has a plurality of cooling ribs 13.

The fan 47 arranged on the pump shaft 15 generates an air stream which is guided by way of the fan cover 14 over that region of the bearing carrier 5 which is provided with the ribs 13. In this way, the transfer of heat between the bearing carrier 5 and the ambient air is increased. The cooling action is further improved.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A pump arrangement for conveying a medium, comprising:
   a hydraulics housing;
   a housing cover configured to cooperate with the hydraulics housing to define a flow chamber;
   a pump shaft rotatable about an axis of rotation;
   an impeller located in the flow chamber and arranged on a first end of the pump shaft;
   a bearing carrier;
   a lubrication and cooling system in the bearing carrier configured to provide oil circulation; and
   a filler body surrounding at least a second portion of the pump shaft is provided in the interior of the bearing carrier, wherein
      a first annular space is formed between the filler body and the pump shaft, and
      a second annular space is formed between the filler body and an outer wall of the bearing carrier.

2. The pump arrangement as claimed in claim 1, wherein
an interior of the bearing carrier includes a first bearing receptacle configured to receive a first bearing and a second bearing receptacle, configured to receive a second bearing, and
the first bearing and the second bearing are arranged to support rotation of the pump shaft about the axis of rotation.

3. The pump arrangement as claimed in claim 2, further comprising:
a bearing cover; and
a conveying element located within the bearing cover between the first bearing and the second bearing,
wherein conveying element is one of formed on the pump shaft or is arranged on the pump shaft as a separate element is provided within the bearing carrier.

4. The pump arrangement as claimed in claim 3, wherein at least one chamber surrounding at least a first portion of the pump shaft is located in the bearing carrier adjacent to the first bearing receptacle.

5. The pump arrangement as claimed in claim 4, wherein the at least one chamber is subdivided into individual segments by separating walls.

6. The pump arrangement as claimed in claim 5, wherein the filler body has an inner wall facing toward the pump shaft and an outer wall facing away from the pump shaft, and
a cavity in the filler body is located between the inner wall and the outer wall of the filler body.

7. The pump arrangement as claimed in claim 6, wherein the filler body extends in a radial direction relative to the rotation axis as far as an inner lateral surface of the outer wall of the bearing carrier, and
at least one groove is provided at an outer side of the outer wall of the filler body.

8. The pump arrangement as claimed in claim 6, wherein an annular projection extends into a region within the bearing cover, and
at least one cutout is provided at a free face side of the annular projection facing away from the filler body.

9. The pump arrangement as claimed in claim 8, wherein a guide device is arranged at the free face side of the annular projection.

10. The pump arrangement as claimed in claim 9, further comprising:
a fan cover coupled to the bearing carrier; and
a fan wheel coupled to the pump shaft arranged in the fan cover.

11. The pump arrangement as claimed in claim 10, wherein
the conveying element includes an annular element with a first face side and a second face side opposite the first face side.

12. The pump arrangement as claimed in claim 11, wherein
at least one vane is arranged on an outer lateral surface of the annular element and extends from a region adjacent to the first face side in a diagonal direction relative to the rotation axis to a region adjacent to the second face side.

13. The pump arrangement as claimed in claim 5, wherein
an annular projection extends into a region within the bearing cover, and
at least one cutout is provided at a free face side of the annular projection facing away from the filler body.

14. The pump arrangement as claimed in claim 13, wherein
a guide device is arranged at the free face side of the annular projection.

15. The pump arrangement as claimed in claim 14, further comprising:
a fan cover coupled to the bearing carrier; and
a fan wheel coupled to the pump shaft arranged in the fan cover.

16. The pump arrangement as claimed in claim 15, wherein
the conveying element includes an annular element with a first face side and a second face side opposite the first face side.

17. The pump arrangement as claimed in claim 16, wherein
at least one vane is arranged on an outer lateral surface of the annular element and extends from a region adjacent to the first face side in a diagonal direction relative to the rotation axis to a region adjacent to the second face side.

* * * * *